Feb. 17, 1942.        G. C. MONCKMEIER        2,273,131
TRUNK OR GRILLE GUARD FOR AUTOMOBILES
Filed March 4, 1938
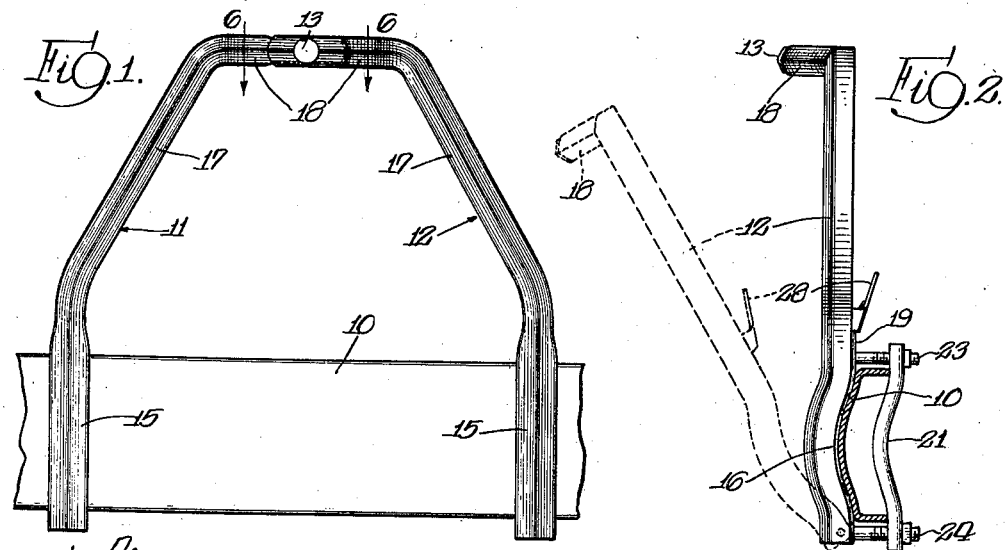
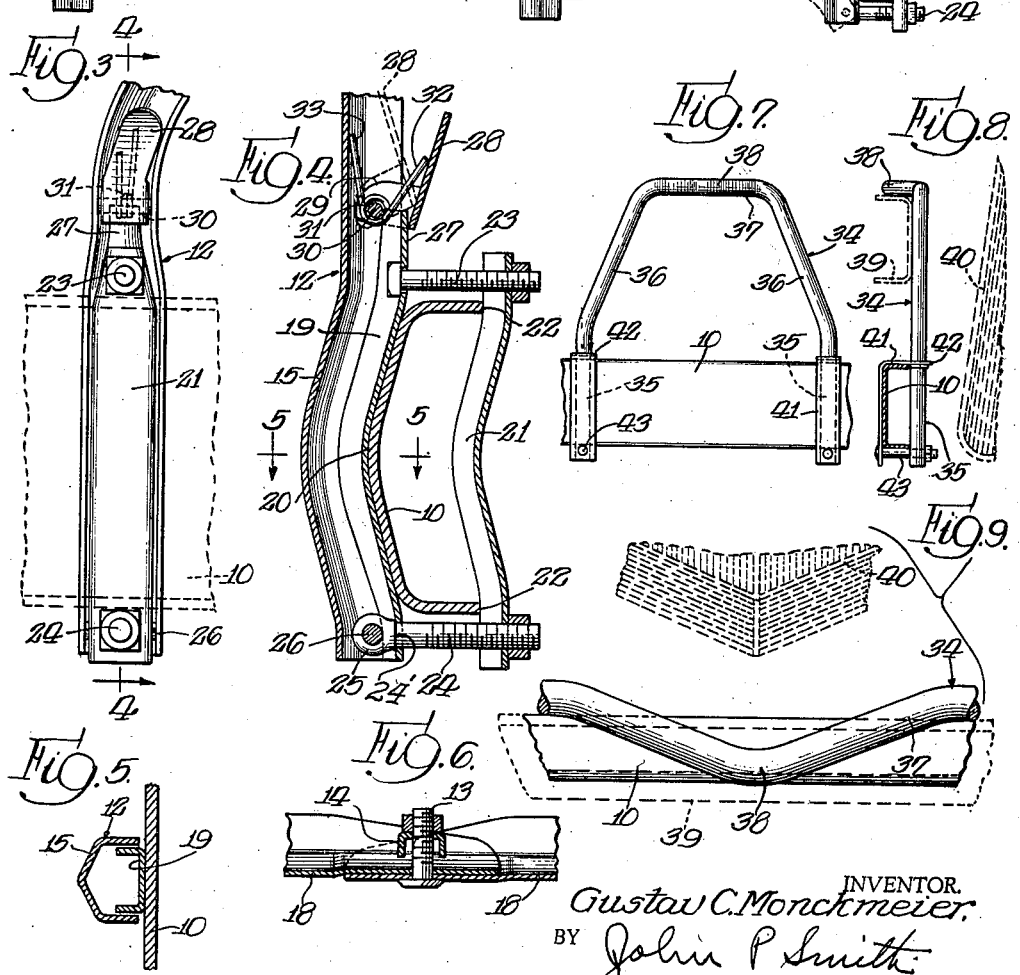
INVENTOR.
Gustav C. Monckmeier
BY John P. Smith
ATTORNEY.

Patented Feb. 17, 1942

2,273,131

UNITED STATES PATENT OFFICE 2,273,131

TRUNK OR GRILLE GUARD FOR AUTOMOBILES

Gustav C. Monckmeier, Davenport, Iowa

Application March 4, 1938, Serial No. 193,875

4 Claims. (Cl. 293—55)

The present invention relates generally to a trunk and grille guard for automobiles, but more particularly to a novel and improved construction of a trunk and grille guard which prevents the interlocking of a colliding bumper and also affords sufficient space when the same is mounted on the front bumper so that if the guard is bent to a certain extent the same will not strike or mar the grille.

One of the primary objects of the present invention is to provide a novel and improved trunk and grille guard adapted to be attached to a conventional automobile bumper so that the upper end is offset outwardly away from the automobile so as to form a stop in order to prevent colliding bumper of another automobile from riding over the guard and interlocking therewith.

A further object of the invention is to provide a novel and improved grille guard which is adapted to be attached to the front automobile bumper and which has an upper horizontal portion bent forwardly so as to afford greater spacing between the guard proper and the pointed portion of the grille, thereby affording greater protection or margin of safety in the event of a collision at the front end.

A still further object of the invention is to provide a novel and improved trunk and grille guard having novel means for pivotally attaching the same to the bumper so that access to the trunk may be readily accomplished.

These and other objects are accomplished by providing a construction and an arrangement of the various parts in the manner hereinafter described and particularly pointed out in the appended claims.

Referring to the drawing:

Fig. 1 is a front elevational view of the preferred form of my improved construction of a trunk and grille guard and the manner in which it is attached to the conventional bumper;

Fig. 2 is a side elevational view of the same illustrating the manner in which it may be pivoted or swung to the dotted line position;

Fig. 3 is an enlarged fragmentary and rear elevational view illustrating the manner in which it is attached and pivotally connected to the bumper;

Fig. 4 is a cross sectional view taken on the line 4—4 in Fig. 3;

Fig. 5 is a fragmentary cross sectional view taken on the line 5—5 in Fig 4;

Fig. 6 is a cross sectional view taken on the line 6—6 in Fig. 1;

Fig. 7 is a front elevational view of my improved form of trunk and grille guard;

Fig. 8 is a side elevational view of the same illustrating the manner in which a colliding bumper in broken lines strikes the stop and prevents interlocking; and Fig. 9 is an enlarged fragmentary top elevational view illustrating the manner in which the stop or offset portion of the guard affords greater protection to the grille.

In illustrating the preferred form of my invention I have shown the same in connection with and mounted on the conventional form of channel-like or curved automobile bumper 10. The trunk and grille guard in this instance is preferably though not necessarily made of two parts or arms 11 and 12. The upper ends of these arms are bent horizontally toward each other and secured together by a bolt 13 and clamping member 14. When these parts are secured together and mounted on the bumper they assume a substantially letter A formation or configuration with the apex flat or horizontal. Each of these arms or members are channel form in cross section and have their vertically extending lower ends or legs 15 curved outwardly as shown at 16 so as to conform with the curvature of the bumper 10. Just above the vertical portions 15 the arms converge towards one another as shown at 17 and have their upper ends bent horizontally and bowed forwardly in substantially the same plane as shown at 18. The horizontal portion 18 of this guard performs the double function of forming a stop against which a colliding bumper of another autmobile will be prevented from riding over the guard and interlocking therewith. Bowing or curving this portion of the guard forwardly also gives greater clearance between the guard proper and the forwardly curved or bulged grille of the presently constructed automobile in the event the guard is bent rearwardly. A more complete description and function of operation of this important feature will hereinafter be described. The guard in this instance is pivotally attached to a clamping bracket which includes a strap 19 of channel-like cross section and is curved or bowed outwardly as shown at 20 so as to conform with the forward surface of the bumper 10. This clamping member 20 is secured in position by a second clamping member 21 of similar construction which has its upper and lower ends engage the edges of the channel bumper 10 as shown at 22. These clamping members are secured to the bumper 10 by a conventional bolt 23 at their upper ends and by a special form of bolt 24 at their lower ends. This special bolt 24 is provided with a shoulder 24' which abuts against the clamping member 20 and an eye-like head 25 in which is journaled a pin 26. The pin 26 is welded to the sides of and adjacent the lower ends of the vertical legs 15 of the guard, thus permitting the guard to be pivoted about the eyes 25 when the latch hereinafter described is released and permits the guard to swing from the full line position to the dotted line position shown in Fig. 2.

The clamping straps 19 project upwardly as shown at 27 and are adapted to be engaged by latch or locking members 28 which have formed integrally therewith right angularly extending ears 29 journaled on pins 30 secured to each of the guard members 11 and 12. The latch 28 is normally actuated outwardly and downwardly to engage the upper ends 27 of each of the clamping members 19 by a spring 31 which has its coiled portion embracing the pin 30 and one of its free ends as shown at 32 engaging the locking member 28. The other end 33 of the spring 31 engages the inner surface of the guard members.

In the modified form of my invention shown in Figs. 7, 8 and 9, the construction or configuration of the guard here shown is essentially the same as that shown in Figs. 1 to 6 inclusive except that the guard in the modified form is made of a round steel rod and is generally indicated by the reference character 34. In this modified form the guard comprises vertically extending portions 35 whose upper portions converge towards one another as shown at 36. The converging portions are connected by horizontal portion 37 which is bent or bowed forwardly as shown at 38 so as to conform with the curved radiator grille and thereby provide greater clearance or space between the grille 40 and the guard. (See Figs. 8 and 9.) This bow or curved forward portion performs the two fold function as previously pointed out with respect to the preferred form illustrated in Figs. 1 to 6 inclusive. One of the functions of this construction is to form a stop for a colliding bumper 39 of another automobile as shown in dotted lines in Figs. 8 and 9 of the drawing. This arrangement prevents the colliding bumper from raising and riding over the top of the guard and interlocking therewith. The other important function of the bowed out guard is that it conforms to the curvature of the radiator grille and therefore gives greater clearance between the radiator grille as indicated by the reference character 40 and shown in dotted lines in Fig. 9 of the drawing. In several models of automobiles as presently constructed the radiator grille is positioned in relatively close proximity to the front bumper, thereby preventing the positioning of a protective guard at this location and that by bowing the guard outwardly in the manner above described it makes it possible to protect this type of grille and affords greater clearance between the guard and the grille in all types of automobiles so that if the guard is accidentally bent toward the grille this additional clearance or spacing affords a greater protection and reduces the possibility of marring or destroying the grille.

The lower vertical ends 35 of the guard are clamped to the inner edges of the curved or channel shaped bumper 10 by a flat clamping member 41 which has a depressed eyelet 42 therein through which the vertical legs 35 of the guard 34 may be inserted. The clamping member is then drawn around the curved front surface of the guard 10 and a bolt 43 is inserted through apertures in the lower ends of each of the legs 35 and through aligned apertures in each of the clamping members 41 to secure the guard in its normal position on the bumper.

Summarizing the advantages and the function of operation of my improved bumper guard, it will be noted that the primary features of the preferred form and the modified form includes substantially right angularly and forwardly projecting curved portion at the top which prevents a colliding bumper from another automobile from riding up over the guard when the collision occurs and thereby stops the interlocking of bumpers which often occurs. This curved portion in the guard is located to conform substantially with the curvature of the grille so as to give a greater spacing between the grille and therefore a greater measure of safety in the event of a collision as clearly shown in Figs. 8 and 9 of the drawing. Another important feature of the present invention involves a novel locking means for locking the guard in full-line position in Fig. 2 or permitting it to be pivoted to the dotted line position so that access to the grille or the trunk may be had. The arrangement of utilizing one of the clamping bolts as one of the elements of the pivot for the guard simplifies the construction as well as produces an arrangement wholly contained within the guard.

While in the above specification I have described a preferred embodiment and one modification which my invention may assume in practice, it will of course be understood that the same is capable of other modifications and modifications may be employed without departing from the spirit and scope of the invention as expressed in the following claims.

What I claim is my invention and desire to secure by Letters Patent is:

1. A grille guard for an automobile comprising two upwardly extending arms having their lower ends secured to a conventional bumper, the upper ends of said arms terminating substantially in a horizontal plane, and an outwardly bowed projection formed on said horizontal portion for affording a greater clearance between said guard and grille.

2. A grille guard for an automobile comprising two upwardly extending arms having their lower ends secured to a conventional bumper, the upper ends of said arms terminating substantially in a horizontal plane, and a forwardly bowed projection formed in the center of said horizontal portion for increasing the spacing relation between said guard and said grille.

3. A trunk and grille guard for an automobile comprising two upwardly extending arms having their lower ends secured to a conventional bumper, the upper ends of said arms terminating substantially in a horizontal plane, an outwardly bowed projection formed on said horizontal portion for increasing the clearance between said grille and said guard and for preventing a colliding bumper from over-riding said guard, and means for pivotally connecting and locking the lower end of said arms to said bumper.

4. A grille guard for an automobile comprising two upwardly extending arms having their lower ends secured to a conventional bumper, the upper ends of said arms terminating substantially in a horizontal plane, a forwardly bowed projection formed in said horizontal portion conforming substantially to the shape of said grille, and means for pivotally connecting the lower end of said arms to said bumper.

GUSTAV C. MONCKMEIER.